Feb. 27, 1934.   G. H. KOCH   1,948,764
ARC WELDING APPARATUS
Filed Dec. 19, 1930   2 Sheets-Sheet 1
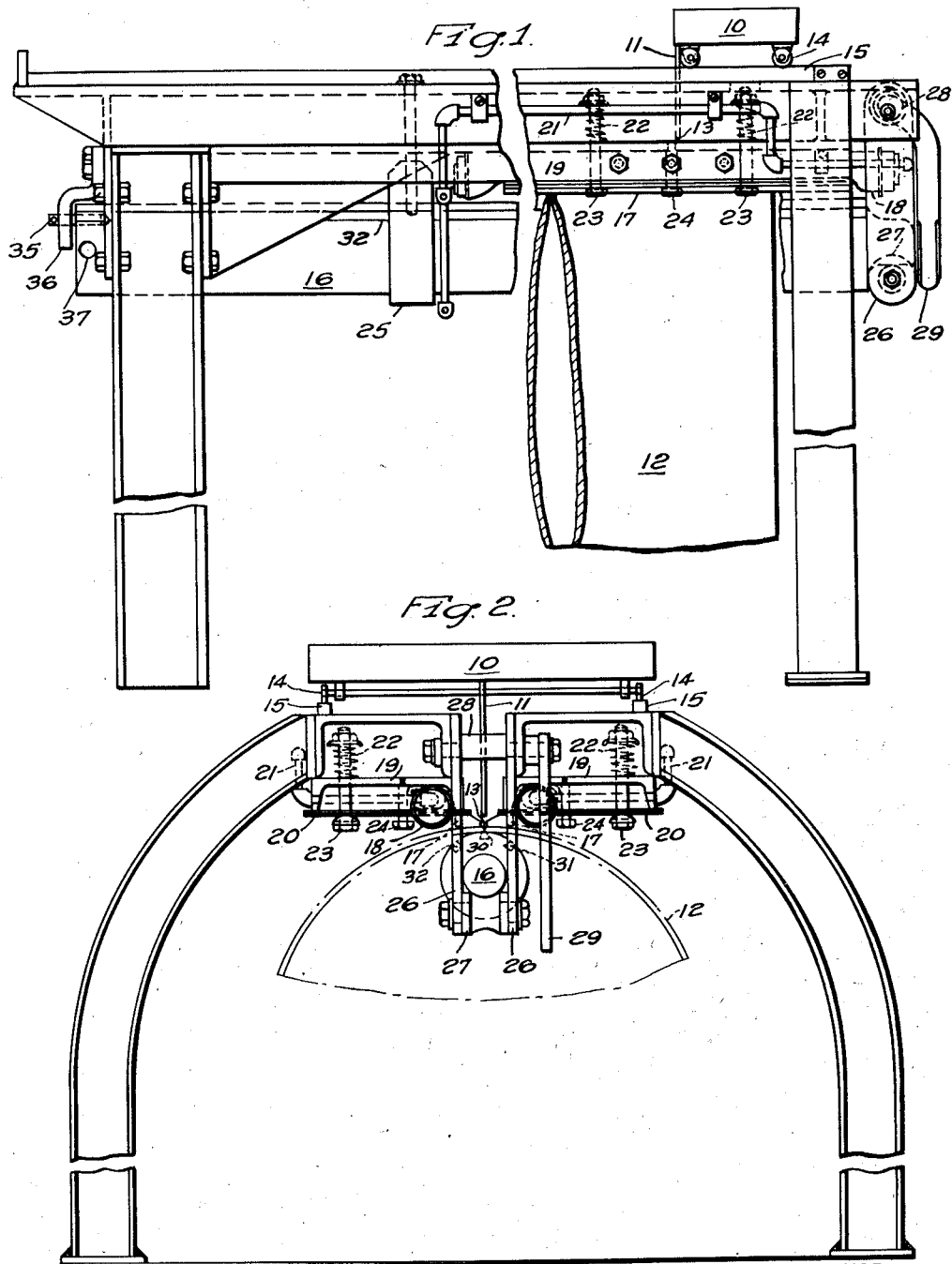
WITNESSES
INVENTOR
Gustav H. Koch.
BY
ATTORNEY Feb. 27, 1934.　　　G. H. KOCH　　　1,948,764
ARC WELDING APPARATUS
Filed Dec. 19, 1930　　　2 Sheets-Sheet 2
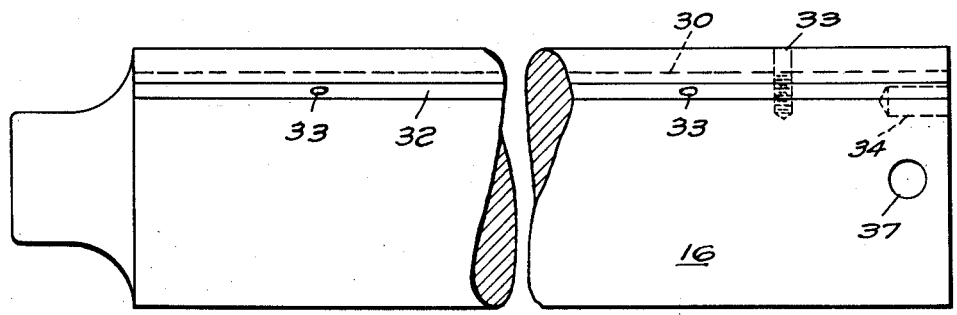
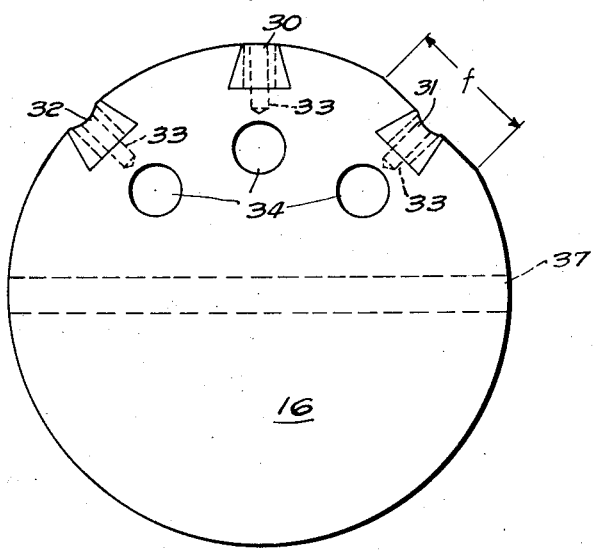
WITNESSES
E. A. McCloskey
Robert R. Lockwood
INVENTOR
Gustav H. Koch.
BY
ATTORNEY Patented Feb. 27, 1934

1,948,764

UNITED STATES PATENT OFFICE 1,948,764

ARC-WELDING APPARATUS

Gustav H. Koch, Wilkinsburg, Pa., assignor to Westinghouse Electric & Manufacturing Company, a corporation of Pennsylvania Application December 19, 1930
Serial No. 503,403

9 Claims. (Cl. 219—8)

My invention relates to arc welding machines and it has particular relation to machines for making longitudinal seam welds in the manufacture of large tanks or pipes.

An object of my invention is to provide a welding anvil for a longitudinal-seam-welding machine that will not be fused to the weld when the welding operation is performed.

Another object of my invention is to provide a longitudinal-seam-welding machine having a welding anvil adapted for use in welding tanks or pipes of different shapes and thicknesses without changing the anvil.

It is also an object of my invention to provide for applying pressure to the edges of the blank to be welded to remove irregularities and facilitate the making of a straight and smooth weld.

A further object of my invention is to provide a longitudinal-seam-welding machine from which the welded parts may be removed without removing the welding anvil.

Still another object of my invention is to provide for forming a bead on the side of the seam opposite to that on which the welding operation is performed.

Other objects of my invention will become evident from the following detailed description, taken in conjunction with the accompanying drawings, in which:

Figure 1 is a view, in side elevation, of a longitudinal-seam-welding machine,

Fig. 2 is a view, in end elevation, of the apparatus illustrated in Fig. 1, showing a cylindrical tank in position for welding, Fig. 3 is an enlarged side view of the welding anvil shown in Fig. 1, and Fig. 4 is an enlarged end view of the welding anvil shown in Fig. 3.

Referring to the drawings, the apparatus shown in Figs. 1 and 2 comprises an automatic arc welding head 10 having provision for feeding the welding electrode 11 to the seam to be welded and moving it along the abutting edges of a cylindrical tank 12 to form a longitudinal-seam-weld at 13. It will be observed that the welding head 10 is mounted on wheels 14 disposed to roll along the rails 15. The welding head 10, which is suitable for automatically feeding the electrode 11 during the welding operation and moving it along the seam, may be of any standard construction well known in the art and will not be described in detail in this specification.

The cylindrical tank 12 is supported by the welding anvil 16 and is clamped securely thereto by holding fingers 17.

Expansible hose members 18 are placed between channels 19 and finger-supporting plates 20 to provide for forcing fingers 17 into contact with the edges of the tank 12, thereby holding it in position for the welding operation and removing any irregularities that may be present in the edges of the blank.

Pipes 21 are arranged to supply fluid pressure to inflate the hose members 18.

In order to maintain fingers 17 out of contact with the tank 12, when the pressure is released from the hose members 18, springs 22 are provided on bolts 23. Stops 24 are arranged to limit the downward travel of the fingers 17.

The welding anvil 16 is supported by a metal strap 25 which is attached to the main frame of the welding machine and by the links 26 and spool 27 as shown.

An eccentric pin 28 is disposed to be turned, by a handle 29, to adjust the position of the spool 27 in a vertical direction to compensate for the deflection of the welding anvil 16.

The welding anvil 16, shown in detail in Figs. 3 and 4, is of such diameter that it is substantially rigid. Longitudinal slots are formed in its surface, and copper bars 30, 31 and 32 are mounted therein. Set screws 33 are provided for retaining the copper bars in position.

In order that the anvil 16 may readily fit flat surfaces or tanks or pipes having large diameters, a flat section shown at "f" is formed.

Recesses 34 are provided in one end of the welding anvil 16 to receive the indexing pin 35 shown in Fig. 1 which may be utilized to properly so locate the anvil that its copper member 30 shall be disposed to be in alinement with the seam to be welded. Clip 36 is arranged, as shown, to hold the indexing pin in its proper position.

The welding anvil 16 may be readily rotated to any desired position by means of a bar (not shown) which may be inserted into opening 37 provided in one end of the anvil.

The operation of the above described apparatus may be set forth as follows:

The indexing pin 35 is removed, and the welding anvil 16 is adjusted to present a predetermined working face which will depend upon the size and shape of the parts to be welded. The pin is then replaced in the clip 36 and recess 34 to keep the welding anvil in the desired position.

Handle 29 is turned in a counter-clockwise direction to cause links 26 to move downward to release the spool 27 from contact with the welding anvil 16, which is then supported as a cantilever by means of strap 25.

The links 26 are swung away from the anvil 16, and the pipe 12 is placed on the anvil. The seam to be welded is centrally located above the copper bar 30, as shown. It is well known that copper will not fuse to the weld which facilitates the removal of the pipe after the welding operation has been performed.

The spool 27 is returned to engage the welding anvil and is raised to a horizontal position by means of handle 29 operating through the eccentric pin 28 and the associated links 26.

Fluid pressure is admitted to the expansible hose members 18, thereby forcing the holding fingers 17 into engagement with the welding anvil 16. Sufficient pressure is applied to the holding fingers to effect the removal of any irregularities in the abutting edges of the blank to be welded.

The desired welding operation may be performed by drawing an arc between the tank 12 and the welding electrode 11 in any well known manner. The welding head 10 is moved along the seam, and the electrode 11 is automatically fed to perform the welding operation.

After the welding operation has been completed, the pressure is released from the hose members 18. Handle 29 is turned to release the spool 27 from contact with the anvil 16 and the links 26 are swung away from it. The completed tank is removed, and the above described process may be repeated.

It will be understood that the position in which the welding anvil is shown is best suited for the welding of relatively thin material. A continuous surface is presented to the seam, and the excess heat of the arc is readily carried away, thereby preventing burning of the edges of the seam. The copper bar 30, being located directly beneath the seam to be welded, prevents fusion between the anvil 16 and the tank 12.

When it is desired to weld flat and relatively thick parts, the welding anvil 16 is so positioned that copper bar 31 located on the flat portion "f" of the welding anvil 16 engages the abutting edges of the parts to be welded. A bead of weld metal is formed on the under side of the parts to be welded as a result of the concave surface of the copper bar 31.

Relatively heavy circular tanks or pipes may be welded by placing the welding anvil 16 in such position that copper bar 32 is in contact with the abutting edges of the seam to be welded. Because of the shape of the copper bar 32, a bead of weld metal is formed inside the tank or pipe when the welding operation is performed.

Although I have shown and described a specific embodiment of my invention, I am fully aware that many modifications thereof are possible. My invention, therefore, is not to be restricted except insofar as is necessitated by the prior art and by the spirit of the appended claims.

I claim as my invention:

1. Arc welding apparatus comprising, in combination, a welding anvil for positioning underneath the abutting edges of a blank to be welded, a frame for supporting the anvil, a clamping member disposed along the upper surface of each of the abutting edges of the blank and hinged to the frame, resilient means disposed to cooperate with the frame and the hinged clamping members for biasing them out of engagement with the blank, and fluid pressure means disposed between the frame and the clamping members for forcing the abutting edges of the welding blank downwardly into engagement with the anvil.

2. Arc welding apparatus comprising, in combination, a frame provided with a pair of longitudinally extending channel members, a welding anvil carried by the frame underneath the channel members for supporting a welding blank along the abutting edges of which a welding operation is to be performed, a clamping member fulcrumed at the under and outer edge of each of the clamping members and disposed along the edges of the blank, resilient means disposed between the channel members and the clamping members for biasing them out of engagement with the blank, and an expansible hose member disposed between each of the channel members and the clamping members for forcing the abutting edges of the welding blank downwardly into engagement with the anvil.

3. Arc welding apparatus comprising, in combination, a frame provided with a pair of longitudinally extending channel members, a welding anvil rotatably mounted in the frame underneath the channel members for supporting a welding blank along the abutting edges of which a welding operation is to be performed, the welding anvil being provided with a plurality of differently shaped faces for engaging work of different shapes, a clamping member fulcrumed at the under and outer edge of each of the channel members and disposed along the edges of the blank, resilient means disposed between the channel members and the clamping members for biasing them out of engagement with the blank, and an expansible hose member disposed between each of the channel members and the clamping members for forcing the abutting edges of the welding blank downwardly into engagement with the anvil.

4. Arc welding apparatus comprising, in combination, a frame provided with a pair of spaced longitudinally extending channel members, a welding anvil rotatably mounted near one end in the frame underneath the channel members for supporting a welding blank along the abutting edges of which a welding operation is to be performed, the welding anvil being provided with a plurality of differently shaped faces for engaging work of different shapes, locking means at one end of the anvil for centering the differently shaped surfaces, a latch mounted on the frame for carrying the unsupported end of the welding anvil, a clamping member fulcrumed at the under and outer edge of each of the channel members and disposed along the edges of the blank, resilient means disposed between the channel members and the clamping members for biasing them out of engagement with the blank, and an expansible hose member disposed between each of the channel members and the clamping members for forcing the abutting edges of the welding blank downwardly into engagement with the anvil.

5. An anvil for positioning underneath the abutting edges of a blank along which a welding operation is to be performed, said anvil being provided with a plurality of differently shaped faces for engaging work of different shapes.

6. An anvil for positioning underneath the abutting edges of a blank along which a welding operation is to be performed, said anvil comprising an elongated cylindrical member having a plurality of differently shaped faces for engaging work of different shapes.

7. An anvil for positioning underneath the abutting edges of a blank along which a welding operation is to be performed, said anvil being provided with a plurality of differently shaped faces for engaging work of different shapes, and an insert composed of material having a relatively high heat and electrical conductivity disposed along each face.

8. An anvil for positioning underneath the abutting edges of a blank along which a welding operation is to be performed, said anvil being provided with a plurality of differently shaped faces for engaging work of different shapes, and an insert composed of material having a relatively high heat and electrical conductivity disposed along each face, said inserts being provided with grooves to permit the weld metal to project below the edges of the joint being welded.

9. An anvil for positioning underneath the abutting edges of a blank along which a welding operation is to be performed, said anvil being provided with a plurality of differently shaped faces for engaging work of different shapes, and a copper insert disposed in a trapezoidal groove along each face.

GUSTAV H. KOCH.